(12) United States Patent
Maguire et al.

(10) Patent No.: US 7,533,526 B2
(45) Date of Patent: May 19, 2009

(54) DRIVE ARRANGEMENT

(75) Inventors: Alan R Maguire, Derby (GB); David S Knott, Loughborough (GB)

(73) Assignee: Rolls-Royce plc, London (GB)

( * ) Notice: Subject to any disclaimer, the term of this patent is extended or adjusted under 35 U.S.C. 154(b) by 301 days.

(21) Appl. No.: 11/396,553

(22) Filed: Apr. 4, 2006

(65) Prior Publication Data
US 2007/0000349 A1   Jan. 4, 2007

(30) Foreign Application Priority Data
May 4, 2005   (GB) ................... 0508989.1

(51) Int. Cl.
*F16D 33/02*   (2006.01)
*F16D 57/04*   (2006.01)
(52) U.S. Cl. .................... 60/342; 60/355; 192/58.3
(58) Field of Classification Search ............... 60/330, 60/342, 355; 74/718; 192/58.3
See application file for complete search history.

(56) References Cited
U.S. PATENT DOCUMENTS

| | | | | |
|---|---|---|---|---|
| 1,900,120 A | * | 3/1933 | Lysholm et al. ............ | 60/354 |
| 2,168,863 A | * | 8/1939 | Lavaud ...................... | 60/356 |
| 2,190,830 A | * | 2/1940 | Dodge ........................ | 60/355 |
| 3,677,004 A | * | 7/1972 | Muller et al. .............. | 60/352 |

FOREIGN PATENT DOCUMENTS

| GB | 0 382 433 SP | 10/1932 |
|---|---|---|
| GB | 1 234 003 SP | 6/1971 |
| GB | 1 261 041 SP | 1/1972 |

\* cited by examiner

*Primary Examiner*—Thomas E Lazo
(74) *Attorney, Agent, or Firm*—W. Warren Taltavull; Manelli Denison & Selter PLLC

(57) ABSTRACT

A drive arrangement for driving, or for being driven by, a fluid is disclosed. The drive arrangement comprises a rotatable member (40) for receiving the fluid, and having mounted thereon a plurality of drive members (56). The drive members (56) are movable between a drive position, in which the drive members can drive, or be driven by, the fluid, and a non-drive position in which the drive members (56) are substantially prevented from driving or being driven by a fluid received in the rotatable member (40).

17 Claims, 5 Drawing Sheets

DRIVE ARRANGEMENT

FIELD OF THE INVENTION

This invention relates to drive arrangements. More particularly, but not exclusively, the invention relates to drive arrangements for use in coupling assemblies, for example for coupling a first shaft to a second shaft. More particularly, but not exclusively, the invention relates to gas turbine engines incorporating such coupling assemblies, for example to provide power to, or take power off the intermediate and/or high pressure shafts.

BACKGROUND OF THE INVENTION

In modern aircraft, there is generally an increased requirement for electric power. Electric power can be taken from the main shafts of the engine, for example, the high pressure and intermediate shafts.

SUMMARY OF THE INVENTION

According to a first aspect of this invention, there is provided a drive arrangement comprising a rotatable member for receiving a fluid, and having mounted thereon a plurality of drive members movable between a drive position, in which the drive members can drive or be driven by, the fluid, and a non-drive position, in which the drive members are substantially prevented from driving, or being driven by, a fluid received in the rotatable member. Thus, the preferred embodiment has the advantage that when the drive members are in the non-drive position any air in the drive arrangement is not driven by, or does not drive, the drive members. This has the effect of reducing heat build up in the drive arrangement.

Preferably, the drive members are each pivotally mounted on the rotatable member at respective pivots. The rotatable member may define an annulus, and the drive members may be arranged around the annulus. Preferably, the drive members are arranged one adjacent the other in a line extending generally centrally of the annulus. Preferably, the pivots define the aforesaid line extending generally centrally of the axis. Conveniently the drive members are spaced from each other around the annulus.

Preferably each drive member is pivotally movable between the drive and the non-drive positions. When each drive member is in the non-drive position, the drive member may be in a feathered position.

The rotatable member may comprise a housing, in which the drive members are mounted.

Preferably, the centre of rotation of each drive member is spaced from the centre of gravity of the drive member. The centre of rotation may be spaced laterally from the centre of gravity and, in one embodiment, the centre of rotation may be spaced circumferentially of the centre of gravity.

Preferably, the pivot is arranged relative to the centre of gravity of the respective drive member to allow the drive member to move to the non-drive position under centrifugal force. Thus, when there is none of the aforesaid fluid present, the drive member can move under centrifugal force to the non-drive position.

Each drive member may be shaped to encourage movement to the drive position when the aforesaid fluid is present. Each drive member may have a profile which facilitates movement to the drive position by the action of the aforesaid fluid on the drive member. The profiles of the drive members may comprise profiles selected from one or more of substantially J shaped, substantially S shaped, substantially L shaped.

Preferably, when the drive members are in the drive position, the drive members extend generally radially of the main axis of the rotatable member. Preferably, when the drive members are in the non-drive position, the drive members extend generally circumferentially of the main axis of the rotatable member.

Conveniently, the fluid comprises a liquid, preferably a hydraulic liquid, such as an oil.

According to a second aspect of this invention, there is provided a coupling assembly comprising first and second drive arrangements, co-operatively mounted relative to one another, wherein one of the first and second drive arrangements comprises features according to the first aspect of the invention, and the other of the first and second drive arrangements comprises a second rotatable member and a plurality of A drive members mounted on the second rotatable member, wherein a force transmitted to the first drive arrangement can be transmitted to the second drive arrangement by the action of the drive members of the first drive arrangement on a fluid in the rotatable members, and by the action of the fluid on the drive members of the second drive arrangement.

Conveniently, the second drive arrangement is according to the first aspect of the invention.

According to a third aspect of this invention, there is provided a power transmission arrangement comprising a first power transmission member connected to a first man shaft of an engine, a second power transmission member connected to a second main shaft of an engine and to an ancillary shaft, and a coupling assembly according to the second aspect of the invention to couple the first power transmission member to the second power transmission member to allow power to be transmitted from the ancillary shaft to the first main shaft of the engine via the first power transmission member, and to decouple the first power transmission member from the second power transmission member to allow power to be transmitted to the ancillary shaft via the second power transmission member.

BRIEF DESCRIPTION OF THE DRAWINGS

An embodiment of the invention will now be described by way of example only with reference to the accompanying drawings, in which.

DETAILED DESCRIPTION OF THE INVENTION

Figure 1:
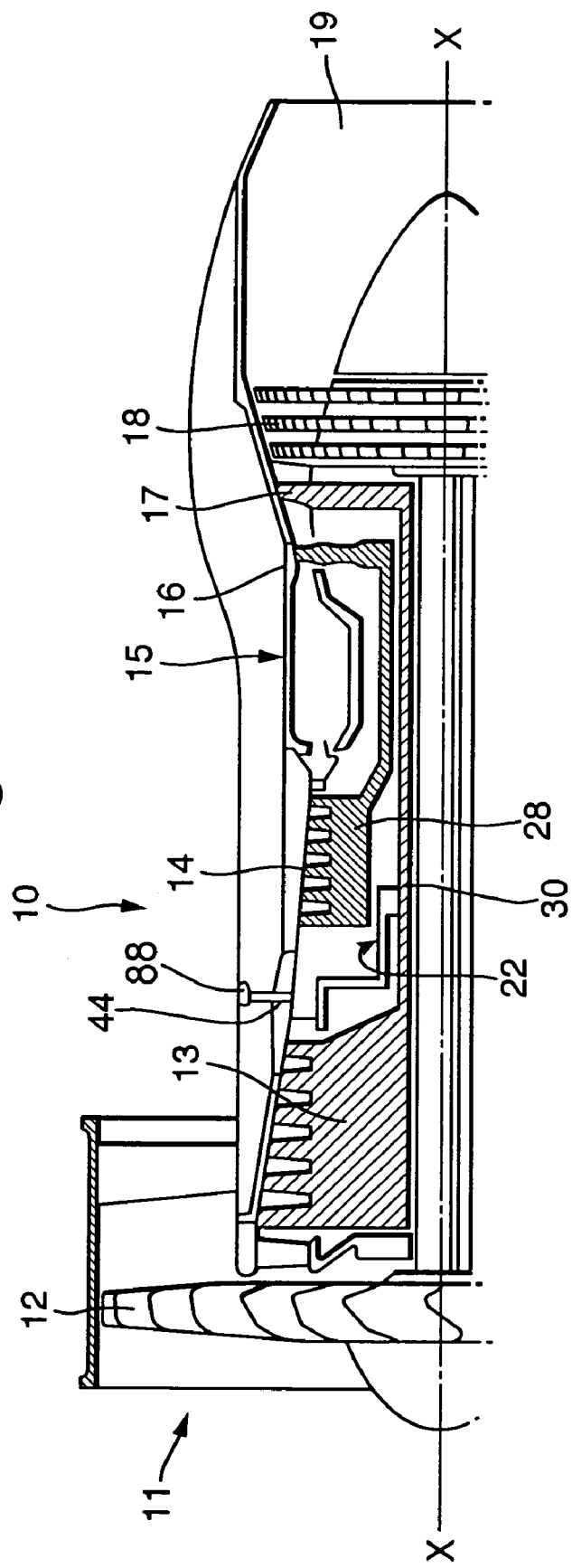
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting main shafts.

Figure 2:
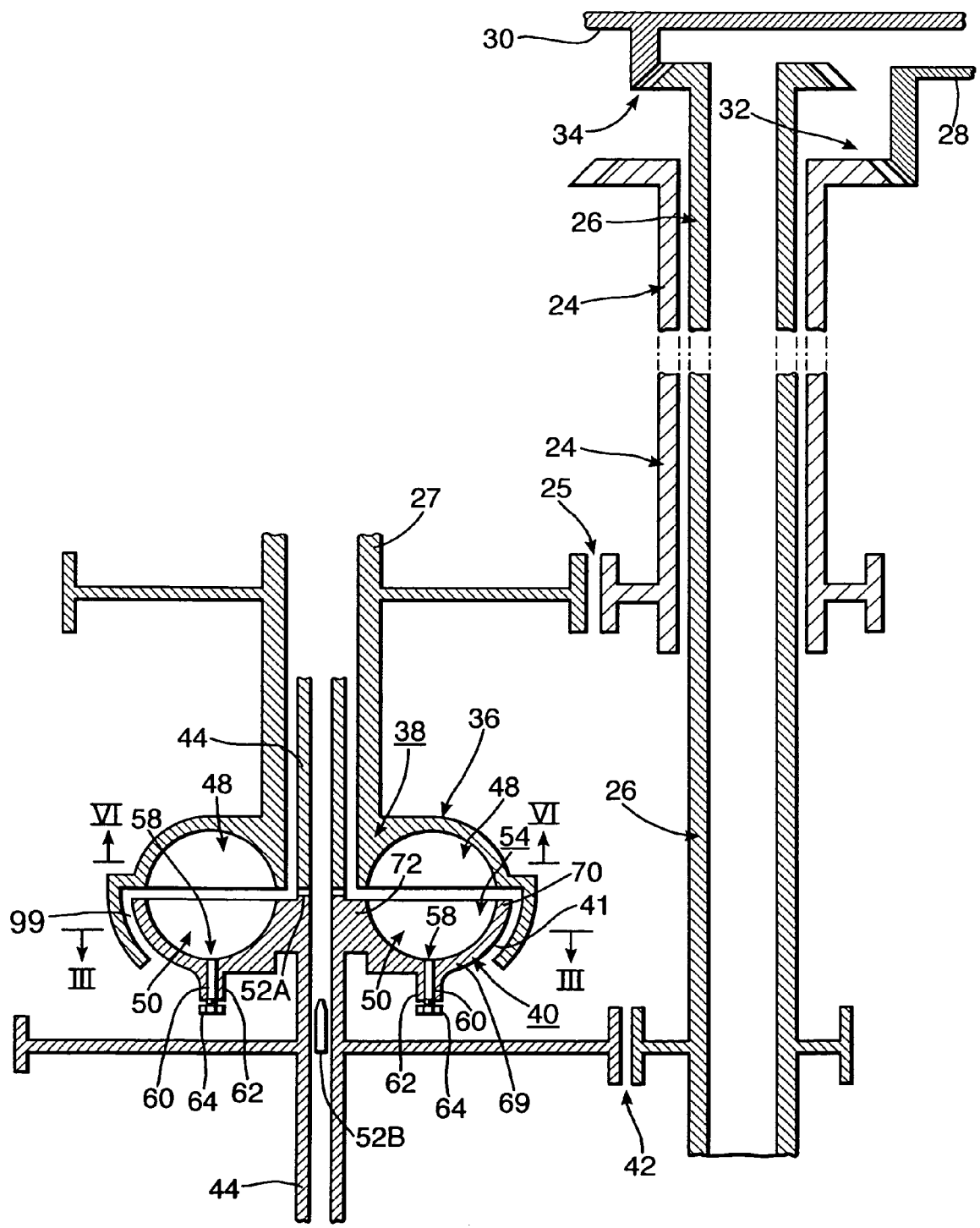
FIG. 2 is a diagrammatic more detailed cross sectional view through part of the engine showing FIG. 1 showing an embodiment of a coupling assembly.
Figure 3:
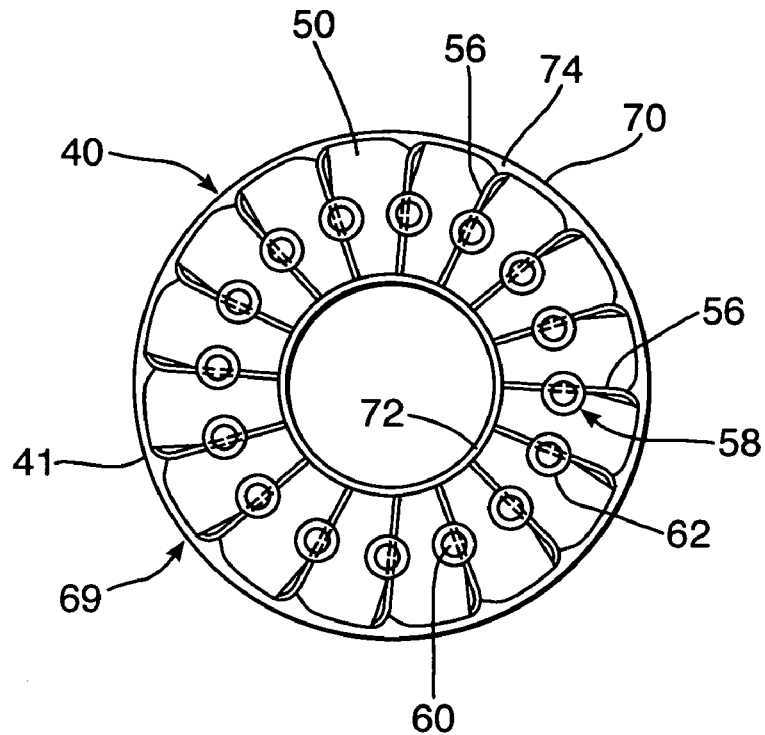
FIG. 3 is a view along the lines III-III in FIG. 2 showing drive members in a drive position.
Figure 4:
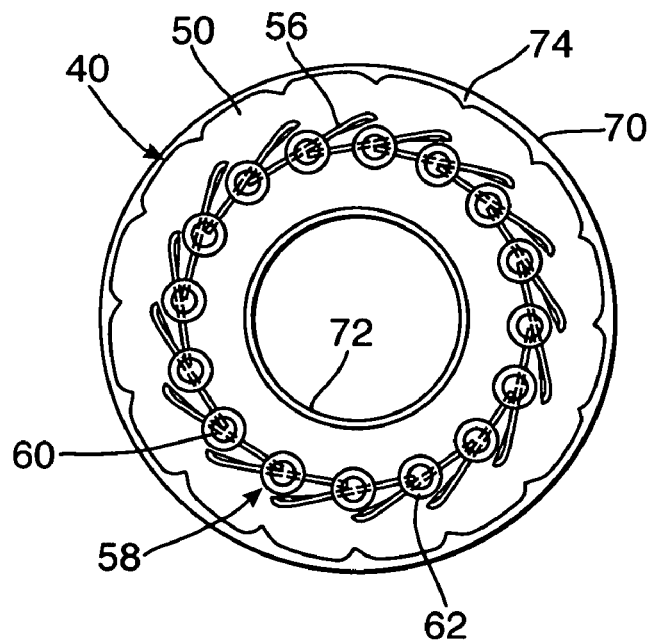
FIG. 4 is a view along the lines III-III in FIG. 2 when the drive members are in non-drive position.

FIGS. 2, 3 and 4 show a power transmission arrangement 20 arranged between the intermediate and high pressure compressors 13, 14. The location of the power transmission arrangement 20 is indicated diagrammatically at 22 on FIG. 1. The power transmission arrangement 20 is usable when starting the engine 10 and also providing a power takeoff during running of the engine 10.

The power transmission arrangement 20 comprises coaxial first and second power transmission shafts 24, 26, with the second power transmission shaft 26 arranged within the first power transmission shaft 24. The first and second power transmission shafts 24, 26 extend generally to first and second torque transmitters in the form of the high pressure and intermediate pressure main shafts 28, 30. The first power transmission shaft 24 extends to a high pressure main shaft 28 interconnecting the high pressure compressor 14 and the high pressure turbine 16. The first power transmission shaft 24 is drivingly connected to the high pressure main shaft 28 by a first bevelled gear arrangement 32. The second power transmission shaft, 26 connects to the intermediate pressure main shaft 30 by a second bevelled gear arrangement 34 in an opposite orientation to the gear 32. The main shafts 28, 30 in use rotate in opposite directions, but the opposite alignment of the bevelled gear arrangement 32, 24, causes the first and second power transmission shafts 24, 26 to rotate in the same direction. The first and second power transmission shafts 24, 26 are selectively coupled to, and decoupled from, each other by a coupling assembly 36, as described below.

The first power transmission shaft 24 is connected via a first ancillary gear arrangement 25 to a first ancillary shaft 27.

The first ancillary shaft 27 is connected to the coupling assembly 36, as described below.

The second power transmission shaft 26 is connected via a second ancillary gear arrangement 42 to a second ancillary shaft 44. The second ancillary shaft 44 extends in one direction to the coupling assembly 36, and in the opposite direction to a start-up motor or power takeoff generator 88 (see FIG. 1).

The coupling assembly 36 comprises a first drive arrangement comprising a first rotatable member 38, and a second drive arrangement comprising a second rotatable member 40. The first and second rotatable members 38, 40 which are generally annular in configuration and define respective annular first and second recesses respectively, providing respective first and second fluid chambers 48, 50. The rotatable members 38, 40 are mounted one upon the other, as shown in FIG. 2, such that the fluid chambers 48, 50 are aligned with each other and together define a toroidal chamber 54.

Referring to FIGS. 3 and 4, there is shown sectional plan views of the second rotatable member 40, showing the second fluid chamber 50. The second fluid chamber 50 is provided with a plurality of drive members in the form of vanes 56.

The vanes 56 are pivotally mounted on the rotatable member 40 at respective pivots 58, which are each provided by a respective spindle 60 (see FIG. 2) journalled in projections 62 extending from the second rotatable member 40. Each spindle 60 is secured to its respective projection 62 by suitable fastening means, which may comprise a nut 64 threadably mounted on the respective spindle 60.

Figure 5:
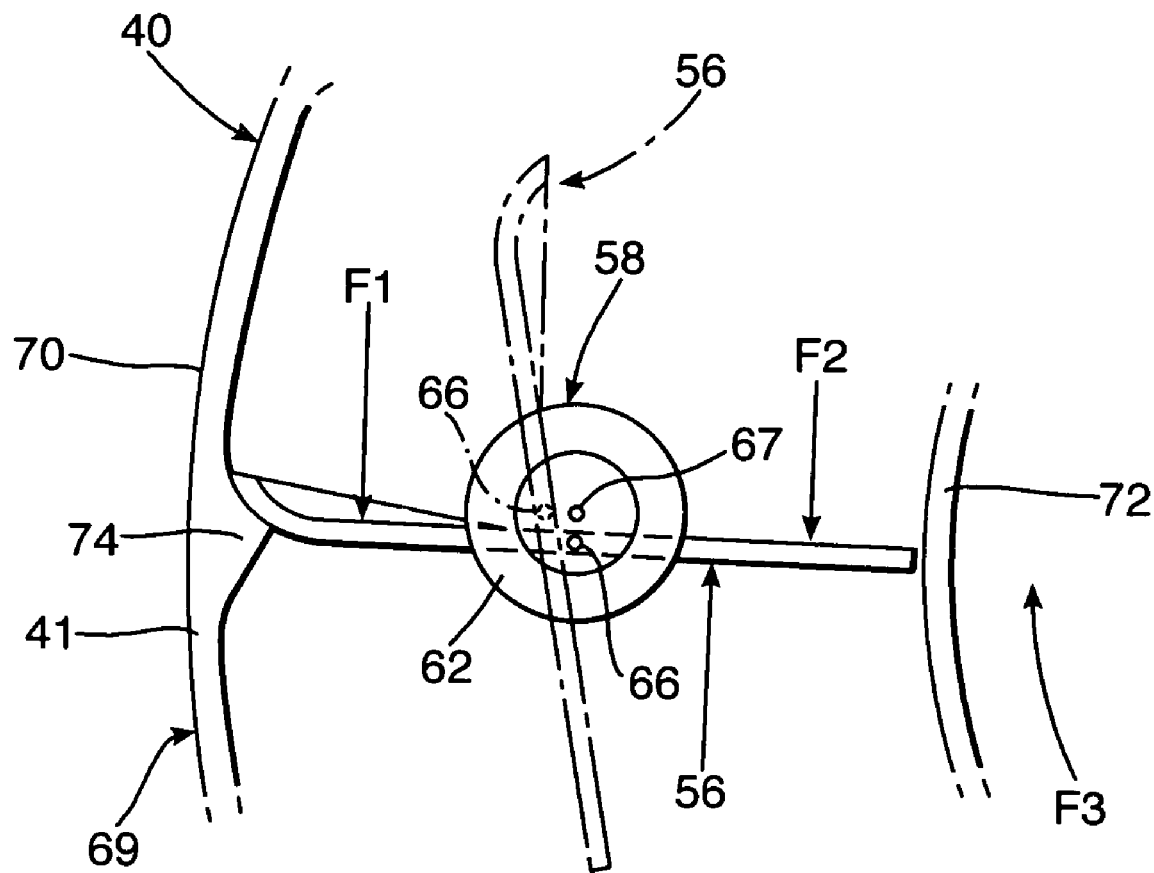
FIG. 5 is a close up view of the region marked V in FIGS. 3 and 4.

Referring to FIG. 5, which shows a close up of one of the vanes 56, the vane 56 has a centre of gravity 66. As can be seen, the vane 56 is attached to the spindle 60 offset from the central axis of the spindle 60. Thus, the vane has a centre of rotation 67 that corresponds to the central axis of the spindle 60, and is off-set from the centre of gravity 66 of the vane 56. The purpose of this is explained below.

The vanes 56 are pivotable about the pivot 58 from a drive position and a non-drive position. In the drive position, shown in solid lines in FIG. 5, the vane 56 can be driven by hydraulic fluid in the toroidal chamber 54, or the vane 56 can drive the hydraulic fluid. In the non-drive position, shown in broken lines in FIG. 5, the vane 56 is in a feathered position and generally parallel to the direction of flow of oil, as shown by the arrows F1 and F2 and to the direction of rotation of the coupling assembly 36, as shown by the arrow F3. In this feathered position, the vanes 56 do not drive, or are not driven by, the hydraulic fluid in the toroidal chamber 54.

The second rotatable member 40 provides a housing 41 for the vanes 56. The housing 41 comprises an annular wall 69 having an outer wall portion 70 and an inner wall portion 72. The outer wall portion 70 is provided with a plurality of inwardly extending stop members 74 to hold the vanes 56 in their drive positions and prevent the vanes 56 pivoting beyond their drive positions.

Figure 6:
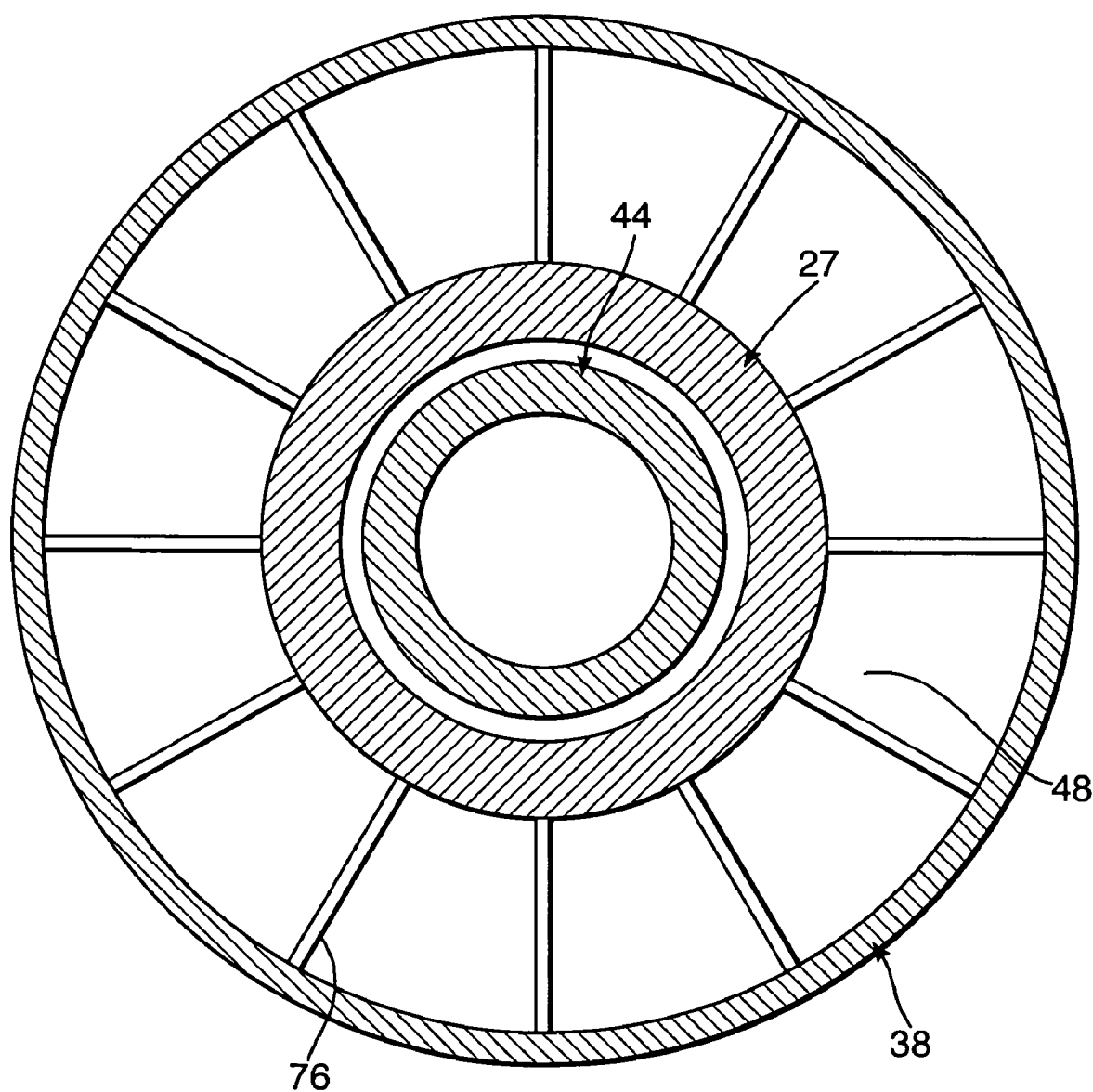
FIG. 6 is a view along the lines VI-VI in FIG. 2.

The first rotatable member 38 includes fixed vanes 76, as shown in FIG. 6. The fixed vanes 76 extend radially within the recess 48. It will be appreciated, however, that the fixed vanes 76 of the first rotatable member 38 could be replaced by pivotable vanes 56 as shown in FIGS. 3, 4 and 5.

A fluid supply means comprising a fluid supply line 52B arranged centrally of the second ancillary shaft 44, and an inlet 52A, are provided. The fluid supply means supplies fluid to a region internally of the toroidal chamber 54.

A drain channel 99 is provided to drain fluid from the main body 38 of the coupling assembly 36. The fluid drained via the drain channel 99 is fed to suitable circulating means (not shown) to recirculate the fluid back to the toroidal chamber 54 via the fluid supply means 52A, 52B.

In use, for example when it is desired to start-up an engine, the second ancillary power transmission member 44 is connected to a start up motor. The toroidal chamber 54 of the coupling assembly 36 is at least partially filled with fluid in the form of an hydraulic oil via the fluid supply means 52A, 52B.

When the start up motor is turned on, the second ancillary power transmission member 44 rotates driving the second power transmission member 26 via the gear arrangement 42. As a result, the second rotatable member 40 of the coupling assembly 36 also rotates.

As explained above the vanes 56 are pivotally mounted on the second rotatable member 40. The supply of the hydraulic fluid in to the toroidal chamber 54 causes the vanes 56 to pivot from their non-drive or feathered positions shown in FIG. 4 to their drive positions shown in FIG. 3, thereby causing the second rotatable member 40 to rotate.

The centrifugal force created by the rotation of the second rotatable member 40 in the direction indicated by the arrow F3 causes the fluid at radially outer regions in the toroidal chamber 54 to experience a greater force F1 than fluid at a radially inner region in the toroidal chamber 54, which experiences a centrifugal force F2. This results in a pressure gradient in the fluid increasing from the radially inner positions to radially outer positions. Thus, if the force F1 of the fluid on the radially outer regions of the vanes 56 is greater than the force F2 of the fluid on the radially inner regions of the vanes 56, and the vanes 56 are held by the forces from the fluid in their drive positions, fluid in the second fluid chamber 50 is moved outwardly by centrifugal force and as the speed increases.

The hydraulic fluid is flung out of the second fluid chamber 50 into the first recess 48. In their drive positions, the vanes 56 assist in causing the fluid to move into the first fluid chamber 48.

As the fluid passes from the second fluid chamber 50 of the second rotatable member 40, into the first fluid chamber 48 of the first rotatable member 38 to strike the fixed vanes 76 (or the pivotable vanes 56, if present) in the first fluid chamber 48 of the first rotatable member 38. This causes a transfer of the angular momentum of the fluid to the first rotatable member 38, to rotate the first rotatable member 38 in the same direction as the second rotatable member 40. The hydraulic fluid is drained out of the toroidal chamber 54 via the drain channel 99 to be recirculated back to the fluid supply means 52A, 52B.

Thus, during start up of the engine 10, the first and second power transmission shafts 24, 26 are coupled together by the action of the fluid between the first and second rotatable members 38, 40 of the coupling assembly 36 and both of the first and second power transmission members 24, 26 rotate together.

As explained above, the first power transmission member 24 is drivingly connected to the high pressure shaft 28 and thereby the rotation of the first power transmission member 24 turns the high pressure shaft 30, thereby turning the high pressure compressor 14 and turbine 16. At the same time, fuel is supplied to the combustor 15 and igniters are operated to ignite the engine.

When ignition has started and the engine is self powering, the supply of fluid to the toroidal chamber 54 of the coupling assembly 36 can be shut off. As a result, fluid draining from the toroidal chamber 54 is not replenished and eventually the toroidal chamber 54 is emptied of fluid and the first rotatable member 38 is decoupled from the second rotatable member 40 to allow the first and second ancillary shafts 27, 44 and the first and second power transmission members 24, 26 and, thereby the high and intermediate pressure main shafts 28, 30 to turn independently.

When fluid is drained from the toroidal chamber 54, the force from the fluid on the pivotable vanes 56 is removed. Since each pivotable vane 56 has a centre of rotation 67 which is offset in the direction of rotation of the second rotatable member 40 relative to the centre of gravity 66, the pivotable vanes 56 are caused by the centrifugal force to pivot to their feathered positions shown in broken lines in FIG. 5. Thus, there is only a minimal force, if any, between the first and second rotatable members 38, 40, and the first and second power transmission shafts 24, 26 are effectively decoupled from each other.

The operation of the gas turbine engine 10 is required to provide electricity to various parts of the aeroplane. Power is taken off from the intermediate pressure main shaft 30 via the second power transmission shaft 26 which is connected by the gear 34 to the intermediate pressure main shaft 30. The second power transmission shaft 26 is also connected via the gear arrangement 42 to the ancillary shaft 44 which, in turn, can be connected to a generator for generating electric power. Thus, when the coupling assembly 36 is in its decoupled condition, decoupling the first and second power transmission shaft 24, 26, from each other, power can be taken directly from the intermediate pressure shaft 30 without involving the high pressure shaft 28.

Various modifications can be made without departing from the scope of the invention. For example, when the vanes 56 are in their feathered position, as shown in FIG. 4, they lie at approximately 80° to their drive position. The vanes could be configured such that they lie at substantially 90° to their drive position when the vanes 56 are in their feathered position.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A drive arrangement comprising a rotatable member for receiving a fluid, and having mounted thereon a plurality of drive members movable between a drive position, in which the drive members can drive, or be driven by, the fluid, and a non-drive position, in which the drive members are substantially prevented from driving, or being driven by, a fluid received in the rotatable member wherein the drive members are each pivotally mounted on the rotatable member at respective pivots, and each drive member is pivotally movable between the drive and non-drive positions wherein the centre of rotation of each drive member is spaced from the centre of gravity of the respective drive member and wherein the centre of rotation is arranged relative to the centre of gravity of the respective drive member to allow the drive member to move to the non-drive position under-centrifugal force, whereby when there is substantially none of the aforesaid fluid present, the drive member can move under centrifugal force to the non-drive position.

2. A drive arrangement according to claim 1 wherein the rotatable member defines an annulus, and the drive members are arranged around the annulus.

3. A drive arrangement according to claim 2 wherein the drive members are arranged one adjacent the other in a line extending generally centrally of the annulus.

4. A drive arrangement according to claim 3 wherein the pivots define the aforesaid line extending generally centrally of the axis.

5. A drive arrangement according to claim 2 wherein the drive members are spaced from each other around the annulus.

6. A drive arrangement according to claim 1 wherein the centre of rotation is spaced circumferentially of the centre of gravity of each vane.

7. A drive arrangement according to claim 1 wherein each drive member is shaped to encourage movement to the drive position when the aforesaid fluid is present.

8. A drive arrangement according to claim 7 wherein each drive member has a profile which facilitates movement to the drive position by the action of the aforesaid fluid on the drive member.

9. A drive arrangement according to claim 8 wherein the profiles comprise profiles selected from one or more of substantially J shaped, substantially S shaped, substantially L shaped.

10. A drive arrangement according to claim 1 wherein when the drive members are in the drive position, the drive members extend generally radially of the main axis of the rotatable member, and when the drive members are in the non-drive position, the drive members extend generally circumferentially of the main axis of the rotatable member.

11. A drive arrangement according to claim 1 wherein the fluid comprises a liquid.

12. A drive arrangement according to claim 1 wherein the fluid is a hydraulic fluid.

13. A drive arrangement according to claim 1 wherein the rotatable member comprises a housing in which the drive members are mounted.

14. A coupling assembly comprising first and second drive arrangements, co-operatively mounted relative to one another, wherein one of the first and second drive arrangements comprises features according to claim 1, and the other of the first and second drive arrangements comprises a second rotatable member and a plurality of second drive members mounted on the second rotatable member wherein a force transmitted to the first drive arrangement can be transmitted to the second drive arrangement by the action of the drive members of the first drive arrangement on a fluid in the rotatable members and by the action of the fluid on the drive members of the second drive arrangement.

15. A coupling assembly according to claim 14 wherein the second drive arrangement is a drive arrangement comprising a rotatable member for receiving a fluid, and having mounted thereon a plurality of drive members movable between a drive position, in which the drive members can drive, or be driven by, the fluid, and a non-drive position, in which the drive members are substantially prevented from driving, or being driven by, a fluid received in the rotatable member.

16. A power transmission arrangement comprising a first power transmission member connected to a first main shaft of an engine, a second power transmission member connected to a second main shaft of an engine and to an ancillary shaft, and a coupling assembly according to claim 14 to couple the first power transmission member to the second power transmission member to allow power to be transmitted from the ancillary shaft to the first main shaft of the engine via the first power transmission member, and to decouple the first power transmission member from the second power transmission member to allow power to be transmitted to the ancillary shaft via the second power transmission member.

17. A gas turbine engine incorporating a power transmission arrangement according to claim 16.

* * * * *